(12) United States Patent
Händel et al.

(10) Patent No.: US 6,430,295 B1
(45) Date of Patent: Aug. 6, 2002

(54) METHODS AND APPARATUS FOR MEASURING SIGNAL LEVEL AND DELAY AT MULTIPLE SENSORS

(75) Inventors: Peter Händel, Uppsala; Jim Rasmusson, Vellinge, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/890,768

(22) Filed: Jul. 11, 1997

(51) Int. Cl.⁷ .................. H04B 15/00; A61F 11/06; G10K 11/16

(52) U.S. Cl. ............... 381/94.7; 381/71.11; 708/322

(58) Field of Search ................ 381/94.7, 103, 381/94.1, 73.1, 66, 91, 92, 122, 71.1, 71.11; 708/322

(56) References Cited

U.S. PATENT DOCUMENTS

| | | | |
|---|---|---|---|
| 3,794,766 A | * 2/1974 | Cox et al. | 381/94.7 |
| 4,631,749 A | * 12/1986 | Rapaich | 381/101 |
| 4,672,674 A | * 6/1987 | Clough et al. | 381/94.7 |
| 5,233,661 A | 8/1993 | Kawamura et al. | |
| 5,323,459 A | 6/1994 | Hirano | |
| 5,371,789 A | 12/1994 | Hirano | |
| 5,400,409 A | * 3/1995 | Linhard | 381/94.7 |
| 5,473,701 A | * 12/1995 | Cezanne et al. | 381/94.7 |
| 5,513,265 A | 4/1996 | Hirano | |
| 5,581,495 A | 12/1996 | Adkins et al. | |
| 5,590,241 A | 12/1996 | Park et al. | |
| 5,602,928 A | 2/1997 | Eriksson et al. | |
| 5,740,256 A | * 4/1998 | Castello Da Costa et al. | 381/94.7 |
| 5,754,665 A | * 5/1998 | Hosoi | 381/94.7 |

FOREIGN PATENT DOCUMENTS

| | | |
|---|---|---|
| EP | 639 035 | 2/1995 |
| WO | WO95/34983 | 12/1995 |

OTHER PUBLICATIONS

Widrow et al, "Adaptive Signal Processing", Prentice–Hall Inc., p. 350, Jan. 1985.*
International Search Report dated Nov. 18, 1998.
L. Ljung et al., "Theory and Practice of Recursive Identification," *The MIT Press*, pp. 67–135, 1983.
B. Widrow et al., "Adaptive Signal Processing," Prentice Hall, pp. 99–192, 1985.
Y.T. Chan et al., "Modeling of Time Delay and its Application to Estimation of Non–Stationary Delays," *IEEE Transactions on Acoustics, Speech, and Signal Processing*, vo. ASSP–29, No. 3, pp. 577–581, Jun. 1981.
Peter Händel, "Predictive Digital Filtering of Sinusoidal Signals," *IEEE Transactions on Signal Processing*, pp. 1–22, Oct. 1996.
Y.T. Chan et al., "A Parameter estimation Approach to Time–Delay Estimation and Signal Detection," *IEEE Transactions on Acoustics, Speech, and Signal Processing*, vol. ASSP–28, No. 1, pp. 8–13, Feb. 1980.

(List continued on next page.)

*Primary Examiner*—Xu Mei
(74) *Attorney, Agent, or Firm*—Burns, Doane, Swecker & Mathis, L.L.P.

(57) ABSTRACT

Methods and apparatus for automatic gain and time delay computations between multiple sensors. In exemplary embodiments, one sensor is treated as a reference sensor with respect to a measured signal quantity which is assumed to be a narrowband process. The relative gain and relative time delay in the additional sensors with respect to the same measured quantity are then automatically calculated based on an adaptive filtering algorithm. Advantageously, the disclosed embodiments are implemented using standard digital signal processing components.

30 Claims, 4 Drawing Sheets

OTHER PUBLICATIONS

Y. Haneda et al., "Implementation and Evaluation of an Acoustic Echo Canceller using the Duo–Filter Control System," *NTT Human Interface Laboratories*, pp. 79–82.

K.C. Ho, et al., "Adaptive Time–Delay Estimation in Non-stationary Signal and/or Noise Power Environments," *IEEE Transactions on Signal Processing*, vol. 41, No. 7, pp. 2289–2299, Jul. 1993.

H.C. So et al., "An Improvement to the Explicit Time Delay Estimator," *Dept. of Electronic Engineering*, The Chinese University of Hong Kong, pp. 3151–3154.

S.M. Kuo et al., "Development and Analysis of Distributed Acoustic Echo Cancellation Microphone System," *Signal Processing*, pp. 333–344, 1994.

P.M. Clarkson et al., "Real–Time Adaptive Filters For Time–Delay Estimation," *Institute of Electrical And Electronics Engineers, Proceedings of the Midwest Symposium on Circuits and Systems*, vol. 2, pp. 891–894, Aug., 1989.

P.C. Ching et al., "Constrained Adaptation For Time Delay Estimation With Multipath Propagation," *IEEE Proceedings F. Communications*, vol. 138, No. 5, Oct. 1991.

S.J. Chern et al., "An Adapative Time Delay Estimation with Direct Computation Formula," *Journal of the Acoustical Society of America*, vol. 96, No. 2, pp. 811–820, Aug. 1994.

Sven Fischer et al., "BeamForming Microphone Arrays For Speech Acquistion in Noisy Environments," *Speech Communication*, vol. 20, No. 3, pp. 215–227, Dec. 1996.

\* cited by examiner

METHODS AND APPARATUS FOR MEASURING SIGNAL LEVEL AND DELAY AT MULTIPLE SENSORS

BACKGROUND

The present invention relates to signal processing, and more particularly to the measurement of signal levels and time delays at multiple signal sensors.

In many signal processing applications, it is desirable to determine the relative sensitivity of multiple signal sensors with respect to a particular signal source. For example, in the context of hands-free mobile telephony, dual microphones can be used in combination with beamforming methods to reduce the effects of background noise and echoes in an automobile. To do so, information regarding the relative sensitivities of the microphones with respect to different acoustic sources is used, for example, to form a spatial beam toward a particular user and/or to form a spatial notch against another user or a loudspeaker. Such an approach requires that dynamic information with respect to microphone sensitivity be quickly and accurately obtained.

Figure 1:
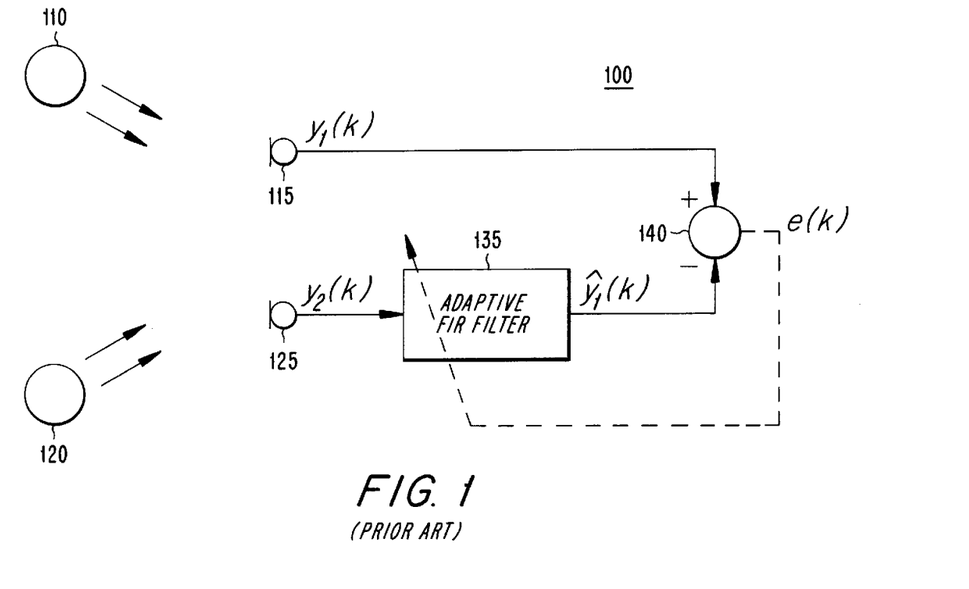
FIG. 1 depicts the prior art signal level and delay measurement system described above.

FIG. 1 depicts a prior art system 100 for measuring the relative sensitivities of dual microphones with respect to different signal sources in the context of hands-free mobile telephony. As shown, the prior art system 100 includes a first microphone 115, a second microphone 125, an adaptive filter 135 and a summing device 140. An output $y_1(k)$ of the first microphone 115 is coupled to a positive input of the summing device 140, and an output $\hat{y}_2(k)$ of the second microphone 125 is coupled to an input of the adaptive filter 135. An output $\hat{y}_1(k)$ of the adaptive filter 135 is coupled to a negative input of the summing device 140, and an output $e(k)$ of the summing device 140 is used as a feedback signal to the adaptive filter 135.

As shown, the first microphone 115 is positioned nearer a first source 110, and the second microphone 125 is positioned nearer a second source 120. For example, the first microphone 115 can be a hands-free microphone attached to a sun visor situated nearer a driver of an automobile, and the second microphone 125 can be a built-in microphone within a mobile unit attached nearer a passenger in the automobile. Although it is not shown in FIG. 1, those skilled in the art will appreciate that analog pre-processing and analog-to-digital conversion circuitry can be included at the output of each of the first and second microphones 115, 125 so that digital signals are processed by the adaptive filter 135 and the summing device 140. The output $e(k)$ of the summing device 140 represents the difference between the output $y_1(k)$ of the first microphone 115 and the output $\hat{y}_1(k)$ of the adaptive filter 135 and is referred to herein as an error signal.

In operation, filter coefficients of the adaptive filter 135 are adjusted using a least-squares algorithm such that the error signal $e(k)$ is minimized. In other words, the adaptive filter 135 is adjusted such that the output $\hat{y}_1(k)$ of the adaptive filter 135 is as close as possible to (i.e., is an estimator of) the output $y_1(k)$ of the first microphone 115. Thus, the adaptive filter 135 attempts to model the signal effects created by the physical separation of the microphones 115, 125. For example, when the passenger 120 is speaking, his or her voice will reach the first microphone 115 slightly later than it will reach the second microphone 125, and the corresponding speech signal level received at the first microphone 115 will be somewhat attenuated as compared to the level received at the second microphone 125. Thus, the adaptive filter 135 is adjusted to provide similar delay and attenuation effects.

As a result, the relative time delay and signal attenuation at the microphones with respect to each user can be calculated based on the coefficients of the adaptive filter 135 as described, for example, in Y. T. Chan, J. M. Riley and J. B. Plant, "A parameter estimation approach to time delay estimation and signal detection", IEEE Transactions on Acoustics, Speech and Signal Processing, vol. ASSP-28, February, 1980, which is incorporated herein in its entirety by reference. One disadvantage of the system of FIG. 1, however, is that its performance deteriorates significantly in the presence of background noise. As a result, the system of FIG. 1 is not useful in most practical applications, where significant background noise (e.g., road and traffic noise) is commonplace. Thus, there is a need for improved methods and apparatus for measuring relative signal levels and time delays at multiple sensors.

SUMMARY OF THE INVENTION

The present invention fulfills the above-described and other needs by providing a system in which a fixed filter and an adaptive filter are used in combination to provide accurate and robust estimates of signal levels and time delays for multiple sensors. In exemplary embodiments, the fixed filter includes at least one relatively narrow passband which is used to distinguish signal sources of interest from broadband background noise. In the embodiments, the fixed filter is coupled to a reference sensor and the adaptive filter is coupled to a secondary sensor. An error signal derived from the outputs of the fixed filter and the adaptive filter is used to adjust filter coefficients of the adaptive filter according to a suitable least-squares algorithm. The coefficients of the fixed filter and the adaptive filter are used to compute estimates of the time delay and relative level between the two sensors. The estimates can then be used to make decisions regarding sensor selection and beamforming.

In exemplary embodiments, the functionality of the system is supplemented with an activity detector which indicates when no signal of interest is present. In the activity detector, accumulated energy in the adaptive filter is compared with an expected least value derived from the coefficients of the fixed filter. When the accumulated energy is smaller than the expected value, indicating that there is no signal of interest present (i.e., only background noise is present), the time delay and relative level estimates are set to appropriate values to ensure proper operation of the system even during periods where no signals of interest are present.

In additional embodiments, more than two signal sensors are employed. In such embodiments, one sensor is treated as a reference sensor and coupled to a fixed filter, while each of the additional sensors is coupled to an adaptive filter. For each additional sensor, an error signal derived from the outputs of the fixed filter and the corresponding adaptive filter is used to update the coefficients of the corresponding adaptive filter. Thus, robust estimates of the time delay and relative signal level between the reference sensor and each additional sensor can be computed, and sophisticated decisions can be made with respect sensor selection and beamforming.

Generally, the present invention provides a computationally simple yet accurate and robust method for estimating the time delays and relative signal levels at multiple sensors. The teachings of the invention are applicable in a wide variety of signal processing contexts. For example, in addition to the hands-free mobile telephony application described above, the invention may be used for other acoustic applications such as teleconferencing. Additionally, the present invention is applicable in radio communication applications where the signals of interest are radio-frequency transmissions (e.g., from mobile units and/or base stations in a cellular radio system) and the sensors are radio-frequency-sensitive antenna elements. These and other features and benefits of the present invention are explained hereinafter with reference to the illustrative examples shown in the accompanying drawings.

DETAILED DESCRIPTION OF THE INVENTION

Figure 2:
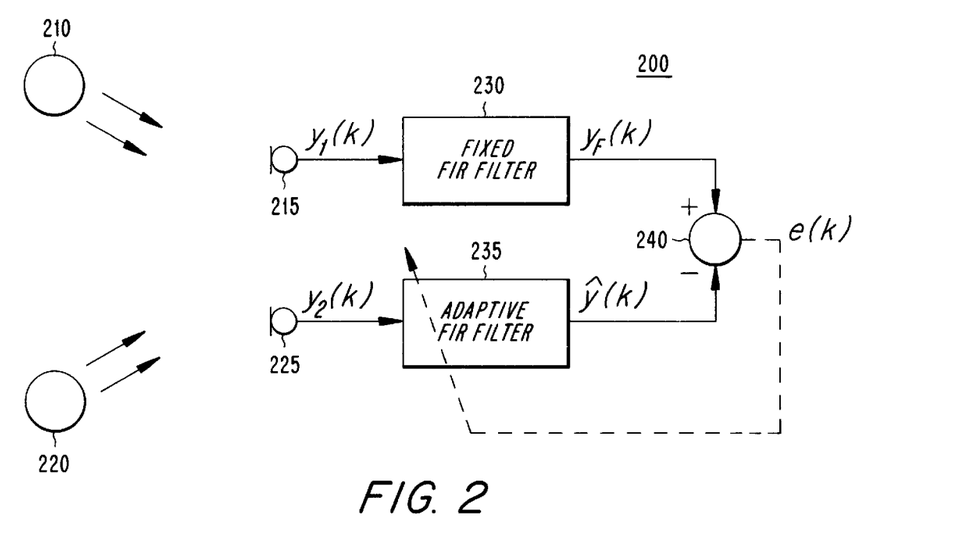
FIG. 2 depicts a signal level and delay measurement system constructed in accordance with the present invention.

FIG. 2 depicts a level and delay measurement system 200 constructed in accordance with the teachings of the present invention. As shown, the system 200 includes a first sensor 215, a second sensor 225, a fixed FIR filter 230, an adaptive FIR filter 235 and a summing device 240. An output $y_1(k)$ of the first sensor 215 is coupled to an input of the fixed filter 230, and an output $y_F(k)$ of the fixed filter 230 is coupled to a positive input of the summing device 240. An output $y_2(k)$ of the second sensor 225 is coupled to an input of the adaptive filter 235 and an output $\hat{y}(k)$ of the adaptive filter 235 is coupled to a negative input of the summing device 240. An error signal e(k) which is output by the summing device 240 is fed back to the adaptive filter 235.

As shown, the first sensor 215 is positioned nearer a first signal source 210, and the second sensor 225 is positioned nearer a second signal source 220. For example, the first sensor 215 can be a hands-free microphone attached to a sun visor situated nearer a driver of an automobile, and the second sensor 225 can be a built-in microphone within a mobile unit attached nearer a passenger in the automobile. Alternatively, the first and second sensors 215, 225 can be antenna elements positioned nearer first and second radio-frequency signal sources, respectively. Although it is not shown in FIG. 2, those skilled in the art will appreciate that analog pre-processing and analog-to-digital conversion circuitry can be included at the output of each of the first and second sensors 215, 225 so that digital signals are processed by the fixed filter 230, the adaptive filter 235 and the summing device 240.

The fixed filter 230 is designed to include at least one relatively narrow pass-band of interest. For example, in the mobile telephony context, a pass-band can correspond to the 300–600 Hz frequency band in which most of the energy of human speech is concentrated. In a radio communication application, a pass-band can correspond to a bandwidth allocated for radio-frequency transmissions. In any case, the coefficients of the fixed filter 230 can be adjusted as necessary to compensate for changes in application requirements or environmental conditions. For example, in a hands-free mobile telephone application, the fixed filter 230 can be set to optimize received signal-to-noise ratio for a particular automobile installation. Furthermore, the coefficients of the filter 230 can be adjusted dynamically, for example in dependence upon measured signal-to-noise ratio.

According to the invention, the fixed filter 230 is designed to provide unity gain and zero phase in each passband. Additionally, the noise gain of the fixed filter 230 is minimized in order to ensure maximal stop-band attenuation. As described in more detail below, the prior information provided by the fixed filter 230 (i.e., the narrowband nature of the signals output by the fixed filter 230) is used to make the system robust against background noise.

In operation, filter coefficients of the adaptive filter 235 are adjusted using a suitable least-squares algorithm such that the error signal e(k) is minimized and such that the output $\hat{y}(k)$ of the adaptive filter 235 is as close as possible to the output $y_F(k)$ of the fixed filter 230. As described below, the relative time delay and signal attenuation at the first and second sensors 215, 225 with respect to each source 210, 220 are calculated based on the coefficients of the adaptive filter 235 and the prior information associated with the fixed filter 230. Although not explicitly shown in FIG. 2, those skilled in the art will appreciate that an appropriate digital signal processor can be integrated with the system 200 to perform the least-squares update of the adaptive filter 235 and to compute the time delay and signal level estimates.

In order to clarify the operation of the system 200 of FIG. 2, a rigorous mathematical analysis is developed below with respect to FIGS. 3 and 4. Although the analysis is explicitly developed for two sensors and two signal sources, those skilled in the art will appreciate that the described approach is readily applicable to applications including an arbitrary number of signal sources and sensors. Additionally, although reference is sometimes made to the acoustic hands-free mobile telephony application described above, those skilled in the art will appreciate that the described approach is also applicable to many other signal processing contexts including the radio communications applications previously mentioned.

Figure 3:
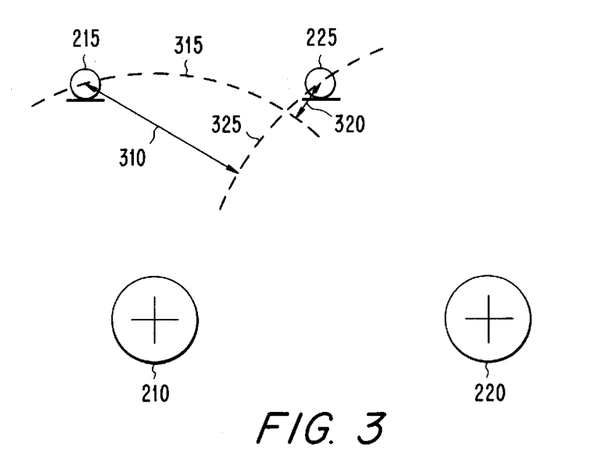
FIG. 3 depicts relative signal levels and time delays of two signals detected at dual signal sensors.

FIG. 3 depicts a typical example of source and sensor placement in two dimensions. In the figure, first and second sensors 215, 225 are positioned adjacent two signal sources 210, 220. As shown, a signal emanating from the first signal source 210 (as indicated by a first dashed arc 315) will impinge upon the first signal sensor 215 before impinging upon the second signal sensor 225. Thus, the signal received at the second sensor 225 due to the first signal source 210 will be a delayed and attenuated version of the signal received at the first sensor 215 due to the same source 210. Additionally, a signal emanating from the second source 220 (as indicated by a second dashed arc 325) will impinge upon the second sensor 225 before impinging upon the first sensor 215, and the signal received at the first sensor 215 due to the second signal source 220 will be a delayed and attenuated version of the signal received at the second sensor 225 due to the same source 220. The spacial separation (and thus the corresponding time delay and level attenuation) of the sensors 215, 225 with respect to the first and second signal sources 210, 220 are indicated in FIG. 3 by second and first line segments 320, 310, respectively.

If the first and second sensor inputs (after analog pre-processing and analog-to-digital conversion) at time instant k are denoted by $x_1(k)$ and $x_2(k)$, respectively, then the second sensor input $x_2(k)$ is generally a delayed and scaled version of the first sensor input $x_1(k)$. In other words, $x_2(k)=1/S \cdot x_1(k-\overline{D})$, where the scale factor S is greater than zero and where the delay $\overline{D}$ may take positive as well as negative values. Strictly speaking, for $\overline{D}<0$ (e.g., for signals emanating from the second signal source 220), the first input $x_1(k)$ is a delayed and scaled version of the second input $x_2(k)$. However, in order to simplify notation, the second input $x_2(k)$ is denoted the delayed signal for all values of $\overline{D}$ without loss of generality.

In order to provide a causal filtering problem, a fixed delay $\Delta$ can be introduced into the signal path following the first sensor. While this is a natural approach in most applications, it is not a prerequisite for the invention to work as intended. This fact is explained in greater detail below. With the extra delay $\Delta$ introduced, one can define first and second intermediate signals $y_1(k)$, $y_2(k)$ as follows:

$$y_1(k)=x_1(k-\Delta) \quad (1)$$

$$y_2(k)=x_2(k)=1/S q^{\Delta-\overline{D}} y_1(k)=1/S y_1(k+D) \quad (2)$$

where q denotes the well known delay operator (i.e., $qy(k)=y(k+1)$, $q^{-1}y(k)=y(k-1)$, etc.), and where D is defined to be $\Delta-\overline{D}$. Note that, for causal filtering, $\Delta>\overline{D}$.

Figure 4:
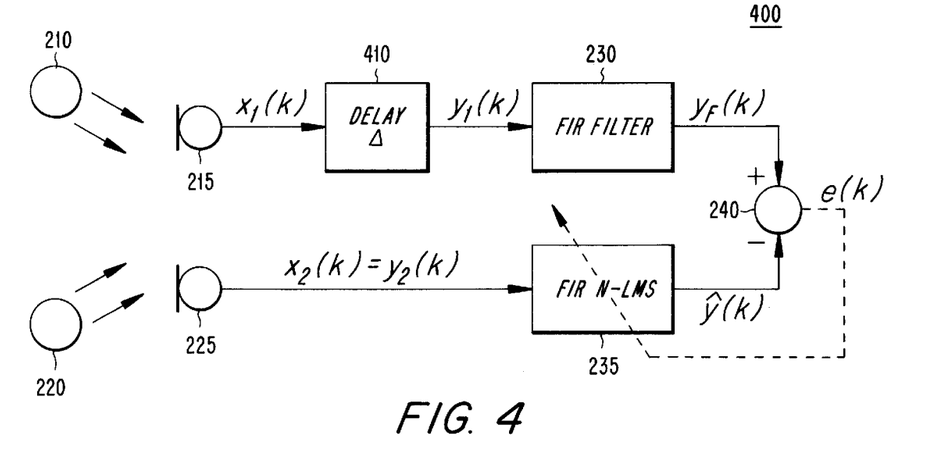
FIG. 4 depicts an alternate signal level and delay measurement system constructed in accordance with the present invention.

To aid discussion, FIG. 4 illustrates the input signals $x_1(k)$, $x_2(k)$ and the intermediate signals $y_1(k)$, $y_2(k)$ in the context of a level and delay measurement system. The system 400 of FIG. 4 is identical to the system 200 of FIG. 2 except that a delay block 410 (corresponding to the fixed delay $\Delta$ described above) is positioned between the first sensor 215 and the fixed filter 230. In the discussion that follows, it is assumed that the coefficients of the fixed filter 230 are stored in a first coefficient vector $c_0$ and that the time-varying coefficients of the adaptive filter 235 are stored in a second coefficient vector $\hat{c}(k)$.

Generally, the present invention provides a computationally simple yet accurate method for estimating the delay D and the scale factor S based on the measured sensor inputs $x_1(k)$ and $x_2(k)$. Advantageously, the method is robust against background noise so that it may be used successfully, for example, in the above described hands-free mobile telephony context. The estimated quantities, say $\hat{D}_k$ and $\hat{S}_k$ (where k indicates that sensor inputs up to and including time instant k are used for the calculation of D and S), can be used to improve system performance.

For example, in the context of mobile telephony, the estimates $\hat{D}_k$ and $\hat{S}_k$ can be used in combination with well known beamforming techniques to electronically enhance and reduce the sensitivity of the sensors 215, 225 with respect to the first and second sources 210, 220. For instance, when a particular source is active (e.g., when the driver is speaking), a beam may be formed in the direction of that source to optimize its reception. Alternatively, when a source provides a signal that should be blocked from the sensors (e.g., when a source is a loudspeaker that may cause bothersome feedback or echo), spatial filtering can be employed to diminish the sensitivity of the sensors with respect to that source.

Furthermore, the system can selectively transmit only the signal detected at a particular sensor when a particular source is active. For example, if one sensor is much more sensitive to the passenger than to the driver (e.g., due to a close physical proximity to the passenger), then it may be desirable to transmit only the signal received at that sensor when only the passenger is speaking.

Returning to FIG. 4, the signal $y_F(k)$ output by the fixed filter 230 (i.e., the filtered version of the first intermediate signal $y_1(k)$) is given by:

$$y_F(k)=y_1(k)^T c_0 \quad (3)$$

$$y_1(k)=(y_1(k) \ldots y_1(k-L))^T \quad (4)$$

$$c_0=(c_0 \ldots c_L)^T \quad (5)$$

where L is the order of the fixed filter 230, and where $\{c_l\}$, $l=0, \ldots, L$ are the fixed filter coefficients. Additionally, the signal y(k) output by the adaptive filter 235 (i.e., the filtered version of the second intermediate signal $y_2(k)$) is given by:

$$\hat{y}(k)=y_2(k)^T \hat{c}(k-1) \quad (6)$$

$$y_2(k)=(y_2(k) \ldots y_2(k-L))^T \quad (7)$$

$$\hat{c}(k-1)=(\hat{c}_1(k-1) \ldots \hat{c}_L(k-1))^T \quad (8)$$

where the vector $\hat{c}(k)$ contains the time varying filter coefficients of the adaptive filter 235. The vector $\hat{c}(k)$ is updated based on the error signal e(k) as follows:

$$e(k)=y_F(k)-\hat{y}(k) \quad (9)$$

$$\hat{c}(k) = \hat{c}(k-1) + \mu \frac{y_2(k)}{\|y_2(k)\|^2} e(k) \quad (10)$$

where $\mu$ is a gain factor (constant or time-varying) in the interval $0<\mu<2$, and where $\|\cdot\|^2$ denotes the squared Euclidian vector norm. The adaptive algorithm described by equations (9) and (10) is the well known Normalized Least Mean Squares (N-LMS) algorithm. Alternative adaptive schemes, such as the Recursive Least Squares (RLS) algorithm or the Least Mean Squares (LMS) algorithm can also be used. For a more detailed description of adaption algorithms generally, see for example B. Widrow and S. D. Stearns, *Adaptive Signal Processing*, Prentice Hall, Englewood Cliffs, N.J., 1985, and L. Ljung and T. Söderström, *Theory and Practice of Recursive Identification*, M.I.T. Press, Cambridge, Mass., 1983, each of which is incorporated herein by reference. Advantageously, each of the above defined quantities can be computed using standard digital signal processing components.

For a broadband source impinging on the sensors 215, 225, the coefficients of the adaptive filter 235 converge toward a delayed and scaled version of the coefficients of the fixed filter 230. In particular, if every coefficient of the fixed vector $c_0$ is 1 (i.e., if effectively no fixed filter is used), the time-varying vector $\hat{c}(k)$ converges toward an approximation of the scaled delay (i.e., $Sq^{\overline{D}}-\Delta=Sq^{-D}$). Such a result has been used to estimate time-delays in prior art systems. See, for example, Y. T. Chan, J. M. F. Riley and J. B. Plant, "Modeling of time delay and its application to estimation of nonstationary delays", *IEEE Transactions on Acoustics, Speech, and Signal Processing*, Vol. ASSP-29, No. 3, pp. 577–581, June 1981, which is incorporated herein by reference. One disadvantage associated with such systems is that overall system performance deteriorates significantly when background noise is present, making the systems impractical in most real-world applications.

Advantageously, the present invention teaches that by incorporating prior knowledge which distinguishes the source signals from background noise, system performance can be significantly improved. To ensure improved overall performance, the priors should be true in all situations. For example, the present invention teaches that such prior information is available when the energy in the source signals of interest is concentrated around one or more center frequencies, while the background noise has a relatively flat and broadband frequency content, or power spectral density. In such a context, the present invention teaches that the fixed FIR filter 230 can be designed as a band-pass filter having one or several pass bands.

For example, for speech signals in a mobile hands-free scenario, it is reasonable to assume that the energy of the speech signals is concentrated in the interval 100–250 Hz. More specifically, the fundamental frequency of a male speaker is typically around 100 Hz, and the fundamental frequency of a female speaker is typically around 250 Hz. In view of this information, the present invention teaches several possible designs alternatives for the fixed filter 230. For example, the fixed filter 230 can be designed to include two pass-bands, the first and second passbands having center frequencies of 100 Hz and 250 Hz, respectively. Alternatively, the fixed filter 230 can be designed to include a single pass-band having a center frequency of 200 Hz and spanning a frequency band which includes the fundamental frequency of female speakers as well as the first harmonic frequency of male speakers.

In practice, the former approach requires the use of higher order filters as compared to the latter approach. Generally, if the number of design frequencies are doubled, then the order L of the filter is doubled as well. In the discussion that follows, a fixed filter 230 having m distinct pass-bands is considered. At the center frequencies $\{\omega_l\}, l=1,\ldots,m$, the filter is designed to provide unity gain and zero phase. Additionally, the fixed filter 230 is designed to provide maximal attenuation in the stop-bands by minimizing the filter noise gain (NG) which is defined as:

$$NG = \frac{1}{2\pi i}\oint C_0(z)C_0(z^{-1})\frac{dz}{z} \tag{11}$$

where $C_0(z^{-1})=c_0+c_1 z^{-1}+\ldots+C_L z^{-L}$, and where the integration proceeds around the unit circle. By Parseval relation, the noise gain for FIR filters is given by:

$$NG = \sum_{l=0}^{L} c_l^2. \tag{12}$$

To design the fixed filter 230, consider an input signal $y_{in}(k)$ comprising a sum of sinusoids as follows:

$$y_{in}(k) = \sum_{l=1}^{m} \alpha_l \sin(\omega_l k + \phi_l) \tag{13}$$

where $\{\omega_l\}, l=1,\ldots,m$ are the desired center frequencies of the fixed FIR filter, $\omega_l \in (0,\pi)$, $\omega_i \neq \omega_j$, $l \neq j$, $\{\alpha_l\}$ are unknown constants $\alpha_l > 0, l=1,\ldots,m$, and $\{\phi_l\}$ are uniformly distributed random variables $\phi_l \in (-\pi, \pi], l=1,\ldots,m$. Next consider a fixed FIR filter 230 having a coefficient vector $c_d$ and providing an output $y_{out}(k)$ which is an exact d-step prediction (after any initial transients have decayed) of the input $y_{in}(k)$ for any d, $-\infty < d < \infty$, as follows:

$$y_{out}(k+d)=y_{in}(k)^T c_d \tag{14}$$

$$y_{in}(k)=(y_{in}(k)\ldots y_{in}(k-L))^T \tag{15}$$

$$c_d=(c_0\ldots c_L)^T \tag{16}$$

For d=0 (i.e., for a coefficient vector $c_0$), the fixed FIR filter 230 provides unity gain and zero phase at the center frequencies $\{\omega_l\}, l=1,\ldots,m$ as desired. Additionally, if the sensitivity to broadband noise is minimized (i.e., if the quantity in equation (12) is minimized), then (for a filter length L, such that L>2m−1) the following result holds true:

$$c_d = L^T(LL^T)^{-1} p(d) \tag{17}$$

where L is the 2m×(L+1) matrix:

$$L = \begin{pmatrix} \cos\omega_1 & \cdots & \cos(L+1)\omega_1 \\ \vdots & & \vdots \\ \cos\omega_m & \cdots & \cos(L+1)\omega_m \\ \sin\omega_1 & \cdots & \sin(L+1)\omega_1 \\ \vdots & & \vdots \\ \sin\omega_m & \cdots & \sin(L+1)\omega_m \end{pmatrix} \tag{18}$$

and where p(d) is the 2m prediction vector:

$$p(d) = \begin{pmatrix} \cos(1-d)\omega_1 \\ \vdots \\ \cos(1-d)\omega_m \\ \sin(1-d)\omega_1 \\ \vdots \\ \sin(1-d)\omega_m \end{pmatrix} \tag{19}$$

Figure 5:
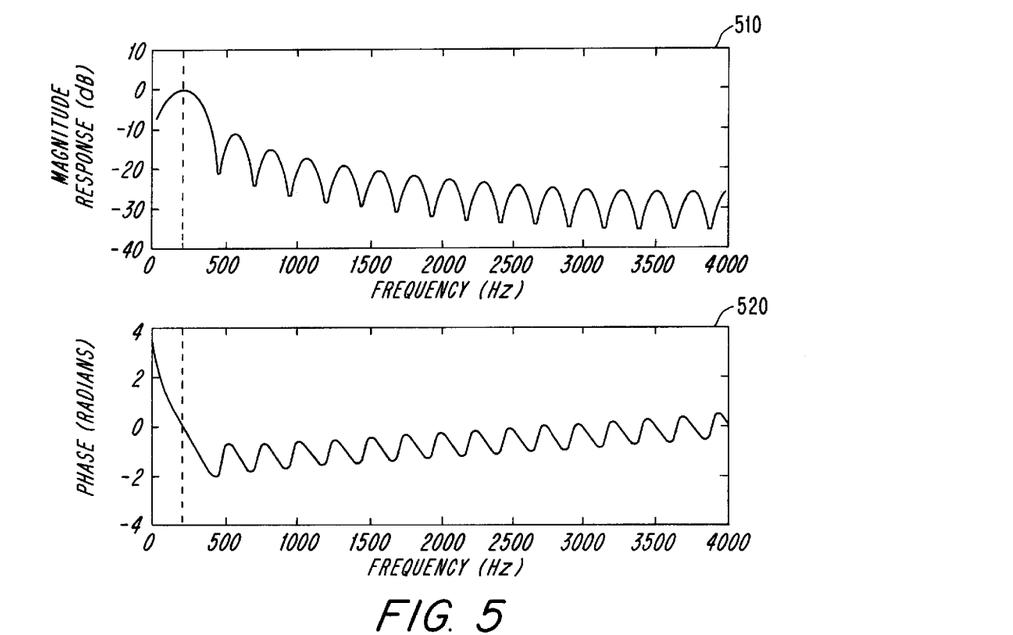
FIG. 5 depicts magnitude and phase responses of an exemplary signal filter which can be employed in the exemplary systems of FIGS. 2 and 4.

First and second plots 510, 520 of FIG. 5 depict the magnitude and phase response, respectively, of a fixed filter 230 designed using the approach described above with d=0, L=32, m=1, $\omega_1$=200 Hz and a sampling rate of 8000 Hz. As shown by dashed lines in FIG. 5, the fixed filter 230 provides unity gain and zero phase at the center frequency 200 Hz as desired.

As described above, the adaptive algorithm used to update the adaptive filter 235 will cause the adaptive filter 235 to converge toward a delayed and scaled replica of the fixed filter 230. Specifically, for a fixed FIR filter 230 with d=0 (i.e., coefficients $c_0$), the coefficients of the adaptive filter 235 will converge as follows:

$$\hat{c}(k) \to S c_{-D} \tag{20}$$

where S and D are the scale factor and time delay, respectively, caused by the physical separation of the sensors 215, 225. Thus, the present invention teaches that estimates of the scale factor S and the time delay D can be calculated from the vector relation given by equation (20). For example, if $\hat{S}_k$ denotes an estimate of S based on the coefficients $\hat{c}(k)$ of the adaptive filter 235, then the estimate $\hat{S}_k$ can be computed from equation (20) as follows:

$$\hat{S}_k c_{-D} = \hat{c}(k) \tag{21}$$

Furthermore, S can be estimated without prior knowledge of D. To see this, first note that equation (21) is a vector equality in which both $c_{-D}$ and $\hat{c}(k)$ are vectors of size L+1. Then, from equation (17), it follows that $Lc_{-D}=p(-D)$. Thus, multiplication of both sides of equation (21) from the left with the 2m×(L+1) matrix L defined in equation (18), gives the following result:

$$\hat{S}_k p(-D) = L\hat{c}(k) \tag{22}$$

where both sides of equation (22) are 2m-vectors. Then, given that $p(D)^T p(D)=m$ (see equation (19)), equation (22) can be re-written as follows:

$$\hat{S}_k^2 m = (L\hat{c}(k))^T L\hat{c}(k) \tag{23}$$

From equation (23), and from the fact that S>0, the estimate $\hat{S}_k$ of the scale factor S at time instant k can be computed as:

$$\hat{S}_k = \frac{\sqrt{(L\hat{c}(k))^T L\hat{c}(k)}}{m} \qquad (24)$$

Given an estimate $\hat{S}_k$ of the scale factor S, an estimate $\hat{D}_k$ of the time delay D can be computed using a least squares fit as follows:

$$\hat{D}_k = \underset{D}{\operatorname{argmin}} \|L\hat{c}(k) - \hat{S}_k p(-D)\|^2 \qquad (25)$$

Equivalently, an estimate $\hat{D}_k$ of the time delay D can be computed as:

$$\hat{D}_k = \underset{\overline{D}}{\operatorname{argmin}} \|L\hat{c}(k) - \hat{S}_k p(\overline{D} - \Delta)\|^2 \qquad (26)$$

Advantageously, the estimate $\hat{D}_k$ can be computed iteratively in practice. Note that the delay gradient dp(D)/dD follows readily from equation (19).

Thus, the present invention teaches that estimates of the scale factor S and the time delay D can be computed in a straightforward fashion. Advantageously, each of the above described computations can be carried out using well known digital signal processing components. Due to the consistent prior information provided by the fixed filter 230, the estimates will be valid even in the presence of background noise.

The system can be further enhanced by the addition of an activity detector which ensures proper system performance even when all signal sources are inactive. For example, when neither source 210, 220 is active, the signals $x_1(k)$ and $x_2(k)$ received at the sensors 215, 225 will comprise uncorrelated noise only. In such case, the adaptive filter coefficients $\hat{c}(k)$ will converge toward the null vector, meaning that the scale factor estimate $\hat{S}_k$ will tend toward zero while the time delay estimate $\hat{D}_k$ may take any value. To prevent this, the estimates $\hat{S}_k, \hat{D}_k$ can be explicitly set to appropriate values when an activity detector senses the absence of signals of interest.

An exemplary activity detector compares an estimate of the filter noise gain to a predetermined threshold (i.e., an expected noise gain value). An appropriate threshold can be derived from equation (12) as follows:

$$NG = c_D^T c_D \qquad (27)$$
$$= \left(L^T (LL^T)^{-1} p(D)\right)^T L^T (LL^T)^{-1} p(D)$$
$$= p(D)^T (LL^T)^{-1} LL^T (LL^T)^{-1} p(D)$$
$$= p(D)^T (LL^T)^{-1} p(D)$$

In operation, the activity detector computes an estimate $\hat{NG}$ of the filter noise gain as a sum of squares of the adaptive filter taps (i.e., $\hat{NG}=\hat{c}(k)^T\hat{c}(k)$). If the estimate $\hat{NG}$ is much smaller than the predetermined threshold, then the delay estimate $\hat{D}_k$ is set to zero, and the scale factor estimate $\hat{S}_k$ is set to unity to ensure proper system operation. Note that since the value of the noise gain NG is independent of the delay D, it is sufficient that a single threshold be stored.

An exemplary system can be implemented using the following pseudocode. Those skilled in the art will appreciate that such pseudocode is readily adapted for implementation using standard digital signal processing components.

Scale Factor and Time Delay Estimation Routine

Filtering: compute output from the fixed FIR filter and the adaptive FIR filter (k denotes the running time index).

Y1=y1(k:-1:k-L);
Y2=y2(k:-1:k-L);
y1hat(k)=Y2'* C;
y1fil(k)=Y1'* C0;
err(k)=y1fil(k)-y1hat(k);

Energy calculations and gain control: A simple gain control scheme is used in order to set the gain $\mu$ to zero if there is low energy in the inputs. The instantaneous energy is compared with a long time average.

emom(k)=sum(y1hat(k:-1:k-L).^2);
eave(k)=0.999* eave(k-1)+0.001 * emom(k);
if (emom(k)>.5*eave(k))
 g(k)=mu;
else
 g(k)=0;
end N-LMS update: Update of the adaptive filter coefficients using the N-LMS algorithm.

C=C+g(k)*Y2*err(k)/((Y2'*Y2)+0.01);

Update of estimates of S and $\overline{D}$: The scaling_estimate is smoothed by a first order recursion, while D is estimated by an iterative gradient method delta denotes the fixed time delay in channel 1.

LLC=LL*C;
PPD=[cos(warr*(1-Dhat+delta)); sin(warr*(1-Dhat+delta))];
DPD=[sin(warr*(1-Dhat+delta)); -cos(warr*(1-Dhat+delta))];
Shat=(1-mu)*Shat+mu*sqrt((LLC'*LLC)/m);
Dhat=Dhat+mu*DPD'*(LLC-Shat*PPD);

Activity detector: If the sum square of estimated filter taps are 20 dB below the sum square of the expected filter taps, the gain is forced to unity and the delay estimate towards zero.

eC=C'*C;
if (eC<0.01*eC0)
 Shat=1;
 Dhat=0;
end

The estimates of S and D are further smoothed by a first order running mean:

Sh(k)=rho*Sh(k-1)+(1-rho)*Shat;
Dh(k)=rho*Dh(k-1)+(1-rho)*Dhat;

To further illustrate operation of the exemplary embodiments, a numerical example using the pseudocode above is provided. In the example, an acoustic scenario is considered in which the sensors are presumed to be microphones and the sources are presumed to be human speakers or loudspeakers transmitting human speech. As noted above, such a scenario can arise in the context of hands-free mobile telephony used in an automobile environment. Though the example is restricted to two sensors and two sources, those skilled in the art will appreciate that the approach can be applied using an arbitrary number of sources and sensors.

With a distance of 0.5 meters between the first source 210 and the first sensor 215, and with the first sensor 215 treated as a reference sensor, the actual time delay at the second sensor 225 with respect to the first source 210 is $\overline{D}$=2.25 samples for a sampling rate of 8 kHz. Using the same assumptions, the actual time delay at the second sensor 225 with respect to the second source 220 is $\overline{D}$=−8.75 samples. These assumptions are reasonable, for example, for a car compartment with a mobile phone (containing the second sensor 225) placed in its cradle near the passenger (the second source 220) and an extra stick-on microphone (the first sensor 215) placed on the sun visor in front of the driver (the first source 210).

In such a car compartment, a rather severe background noise is typically present (e.g., from an AC-fan, the car engine, the road, the wind etc.). For purposes of the numeric example, the sensitivities of the microphones in different directions are assumed to be as shown in Table 1.

TABLE 1

MICROPHONE SENSITIVITY TO DIFFUSE BACKGROUND NOISE AND SIGNAL SOURCES IN DIFFERENT POSITIONS.

| Signal Source | First Sensor 215 (e.g., sun-visor microphone) | Second Sensor 225 (e.g., built-in microphone) |
|---|---|---|
| Diffuse Background Noise | 0 dB | 0 dB |
| First Source 210 (e.g., driver) | +3 dB | 0 dB |
| Second Source 220 (e.g., passenger) | −10 dB | 0 dB |

Figure 6:
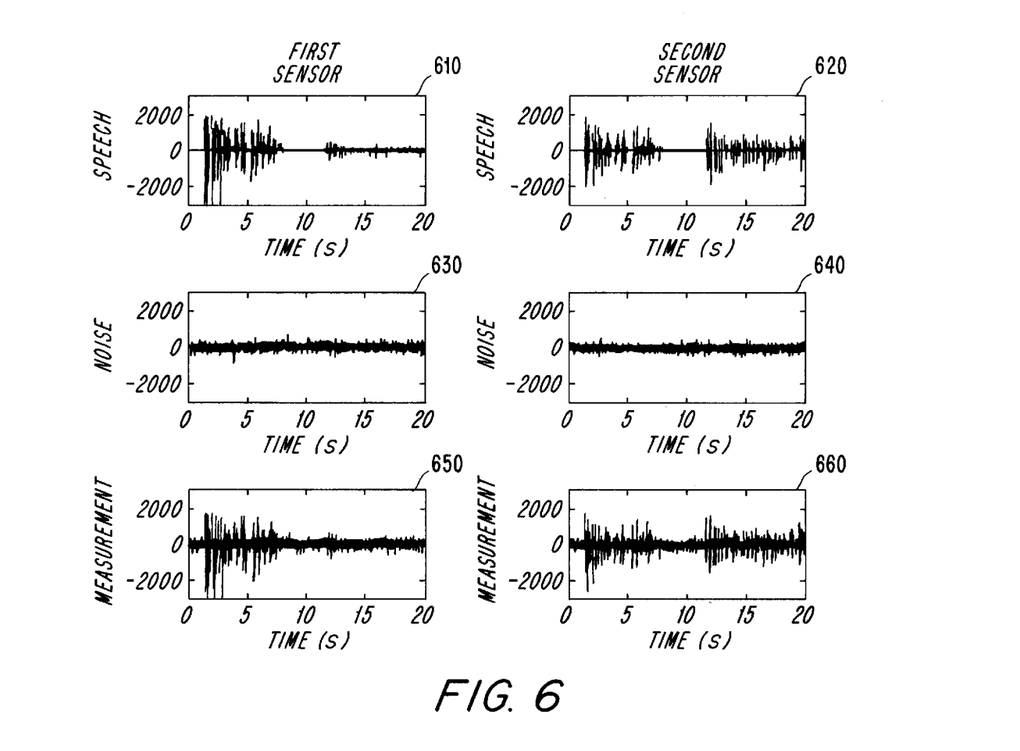
FIG. 6 depicts exemplary speech and noise signals which are used to demonstrate operation of exemplary embodiments of the present invention.

Additionally, synthetic two-channel measurements were created with a male speaker at the location of the first source 210 and a female speaker at the location of the second source 220. The files were concatenated such that there was no speaker activity the first second, then the male speaker was active for 7s, then there was no activity for 3s, and then the female speaker was active for 10s. The signal to noise ratio with respect to the second sensor 225 was 8 dB for the male speaker and 7 dB for the female speaker (measured over the total period during which they were active). The speech signal detected at the first and second sensors 215, 225 are depicted in first and second plots 610, 620, respectively, of FIG. 6.

Additive background noise was modeled as white Gaussian noise. The noise signals detected at the first and second sensors 215, 225 are depicted in third and fourth plots 630, 620, respectively, of FIG. 6. The combined speech and noise signals measured at the first and second sensors 215, 225 are depicted in fifth and sixth plots 650, 660, respectively of FIG. 6.

Figure 7:
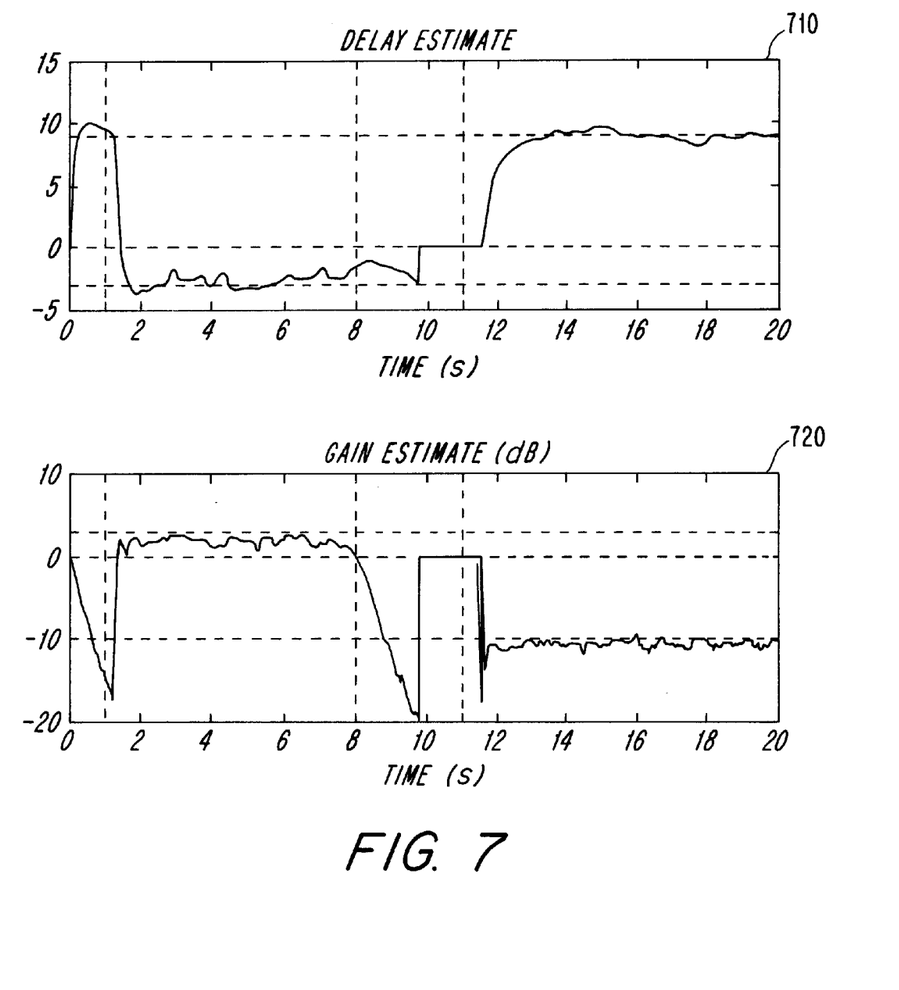
FIG. 7 depicts signal level and delay estimates generated by an exemplary embodiment of the present invention based on the signals of FIG. 6.

In the simulation, the parameters used were: L=32, Δ=10, ω=2π200/8000, m=1, $\mu$=0.01 and rho=0.99. The results are shown in FIG. 7. Specifically, the delay estimate $\hat{D}_k$ is depicted in a first plot 710, and the scale factor estimate $\hat{S}_k$ is depicted in a second plot 720. In both plots 710, 720, every 50-th sample is displayed. Horizontal dashed lines indicate delays of −3, 0, and 9 samples as well as gains of −10 dB, 0 dB, and 3 dB. As shown, the system properly provides scale factor and time delay estimates, respectively, of 0 db and approximately −3 samples when the driver is speaking and −10 db and approximately 9 samples when the passenger is speaking. Additionally, the activity detector properly sets the scale factor and time delay estimates, respectively, to 0 db and 0 samples during the period when both the driver and the passenger are silent.

Although the embodiments have been described in the context of causal filtering (i.e., Δ>0), the teachings of the present invention are equally applicable in the context of non-causal filtering. Specifically, for Δ=0 the adaptive scheme comprises an adaptive block that can serve as a signal smoother, a backward predictor (D<0) and/or a forward predictor (D>0). Thus, it is not necessary that a fixed delay be added in the signal flow (e.g., via delay block 410), and an adaptive scheme with minimum inherent delay can be realized. Such a property can be of substantial practical relevance in many real-time applications. However, because the quality of the estimates will be somewhat less accurate with a non-causal approach (and because narrower passbands are required for the fixed FIR filter 230), the precise value of Δ can be set based upon system design considerations. For example, Δ can be set to cover "most situations" and not "all possible situations" since the system will provide reasonable results even in rare extreme situations.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

What is claimed is:

1. A signal processing device, comprising:

a first signal sensor;

a first filter having an input coupled to an output of said first sensor;

a second signal sensor;

a second filter having an input coupled to an output of said second sensor and having an adjustable filtering characteristic;

a summing device having a first input coupled to an output of said first filter and a second input coupled to an output of said second filter, wherein the adjustable filtering characteristic of said second filter is adjusted in dependence upon an output of said summing device to cause the second filter output to emulate the first filter output; and a processor for computing an estimate of at least one parameter indicating a relationship between said first and second sensors, wherein the estimate is computed as a function of a filtering characteristic of said first filter and as a function of the adjustable filtering characteristic of said second filter, and wherein the estimate includes estimates of a relative time delay and a relative scale factor between said first and second sensors with respect to a signal source.

2. A signal processing device according to claim 1, wherein said first filter, said second filter, said summing device and said processor are implemented using a digital signal processor (DSP) integrated circuit (IC).

3. A signal processing device according to claim 1, wherein said first filter, said second filter, said summing device and said processor are implemented using an application specific integrated circuit (ASIC).

4. A signal processing device according to claim 1, wherein said signal processing device is a telephone and wherein said first and second sensors are microphones.

5. A signal processing device according to claim 1, wherein said signal processing device is a radio transceiver and wherein said first and second sensors are antenna elements.

6. A signal processing device according to claim 1, wherein said first filter is a finite impulse response (FIR) filter having a fixed filtering characteristic.

7. A signal processing device according to claim 1, wherein the filtering characteristic of said first filter includes at least one passband providing unity gain and zero phase delay at a center frequency of the passband.

8. A signal processing device according to claim 7, wherein the filtering characteristic of the first filter includes a passband corresponding to the 300–600 Hz frequency band.

9. A signal processing device according to claim 1, wherein the filtering characteristic of said first filter includes coefficients which are set to minimize a noise gain of said first filter.

10. A signal processing device according to claim 1, wherein the filtering characteristic of said first filter includes coefficients which are adjusted to optimize a signal-to-noise ratio of said first filter.

11. A signal processing device according to claim 1, wherein the adjustable filtering characteristic of said second filter is adjusted using a Normalized Least Mean Squares (NLMS) algorithm.

12. A signal processing device according to claim 1, wherein the adjustable filtering characteristic of said second filter is adjusted using a Least Mean Squares (LMS) algorithm.

13. A signal processing device according to claim 1, wherein the adjustable filtering characteristic of said second filter is adjusted using a Recursive Least Squares (RLS) algorithm.

14. A signal processing device according to claim 1, further comprising a beamformer for shaping a beam pattern provided by said first and second sensors in dependence upon the estimates of the relative time delay and the relative scale factor between said first and second sensors.

15. A signal processing device according to claim 14, wherein the beam pattern includes a spacial beam aimed toward a particular signal source.

16. A signal processing device according to claim 14, wherein the beam pattern includes a spacial notch aimed against a particular signal source.

17. A signal processing device according to claim 1, wherein said processor selects a signal detected by a particular one of said first and second sensors for transmission in dependence upon the estimates of the relative time delay and the relative scale factor between said first and second sensors.

18. A signal processing device according to claim 1, further comprising at least one additional sensor and at least one additional filter having an adjustable filtering characteristic,
wherein the adjustable filtering characteristic of said additional filter is adjusted in dependence upon a difference between the output of said first filter and an output of said additional filter, and
wherein said processor computes an estimate of at least one parameter relating to said first sensor and said additional sensor in dependence upon the filtering characteristic of said first filter and the adjustable filtering characteristic of said additional filter.

19. A signal processing device according to claim 18, wherein said processor computes estimates of a relative time delay and a relative scale factor between said first sensor and said additional sensor with respect to a signal source.

20. A signal processing device according to claim 1, further comprising an activity detector for detecting when a signal source of interest is active, wherein said processor sets the estimates of the relative time delay and the relative scale factor to predetermined values when said activity detector indicates that no signal source of interest is active.

21. A signal processing device according to claim 20, wherein said processor sets the estimate of the relative time delay to zero and the estimate of the scale factor to one when said activity detector indicates that no signal source of interest is active.

22. A signal processing device according to claim 1, further comprising a fixed-delay block positioned in a signal flow path corresponding to said first sensor.

23. A signal processing device according to claim 1,
wherein filtering characteristics of said first and second filters each include a number L of filtering coefficients,
wherein the filtering characteristic of said first filter includes a number m of passbands, each passband l, l $\in$ (1,m), having a center frequency $\omega_l$, and
wherein an estimate $\hat{D}_k$ of a relative time delay D between said first and second sensors and an estimate $\hat{S}_k$ of a relative scale factor S between said first and second sensors, at a time instant k, are computed based upon the adjustable filtering characteristic $\hat{c}(k)$ of said second filter, a matrix L, and a prediction vector p(D), as:

$$\hat{S}_k = \frac{\sqrt{(L\hat{c}(k))^T L\hat{c}(k)}}{m}$$

$$\hat{D}_k = \underset{D}{\mathrm{argmin}} \left\| L\hat{c}(k) - \hat{S}_k p(-D) \right\|^2$$

where the matrix L and the prediction vector p(D) are computed as:

$$L = \begin{pmatrix} \cos\omega_1 & \cdots & \cos(L+1)\omega_1 \\ \vdots & & \vdots \\ \cos\omega_m & \cdots & \cos(L+1)\omega_m \\ \sin\omega_1 & \cdots & \sin(L+1)\omega_1 \\ \vdots & & \vdots \\ \sin\omega_m & \cdots & \sin(L+1)\omega_m \end{pmatrix}$$

$$p(D) = \begin{pmatrix} \cos(1-D)\omega_1 \\ \vdots \\ \cos(1-D)\omega_m \\ \sin(1-D)\omega_1 \\ \vdots \\ \sin(1-D)\omega_m \end{pmatrix}.$$

24. A method for processing signals, comprising the steps of:
detecting a first signal using a first signal sensor;
filtering the first signal using a first filter to provide a first filtered signal;
detecting a second signal using a second signal sensor;
filtering the second signal using a second filter to provide a second filtered signal;
computing a difference between the first filtered signal and the second filtered signal;
adjusting a filtering characteristic of the second filter in dependence upon the difference obtained in said step of computing to cause the second filter output to emulate the first filter output; and
estimating at least one parameter as a function of a filtering characteristic of said first filter and as a function of the filtering characteristic of said second filter, the at least one parameter including estimates of a relative time delay and a relative scale factor between the first and second sensors with respect to a signal source.

25. A method according to claim 24, wherein the filtering characteristic of the first filter includes at least one passband providing unity gain and zero phase delay at a center frequency of the passband.

26. A method according to claim 24, wherein the filtering characteristic of said second filter is adjusted using a Normalized Least Mean Squares (NLMS) algorithm.

27. A method according to claim 24, further comprising a step of shaping a beam pattern provided by said first and second sensors in dependence upon the relative time delay and the relative scale factor obtained as a result of said step of estimating.

28. A method according to claim 24, further comprising a step of selecting and transmitting a signal detected by a particular one of said first and second sensors in dependence upon the relative time delay and the relative scale factor obtained as a result of said step of estimating.

29. A method according to claim 24, further comprising the steps of detecting whether a signal source of interest is active and setting relative time delay and scale factor estimates to predetermined values when said step of detecting indicates that no source of interest is active.

30. A method according to claim 24, wherein the filtering characteristic of the first filter includes a passband corresponding to the 300–600 Hz frequency band.

* * * * *